(12) United States Patent
Tilz et al.

(10) Patent No.: US 9,060,644 B2
(45) Date of Patent: Jun. 23, 2015

(54) SYSTEM AND METHOD FOR THE THERMAL TREATMENT OF A PRODUCT, PARTICULARLY A FOOD ITEM

(75) Inventors: Wolfgang Tilz, Schwetzingen (DE); Dominique Chatard, Heidelberg (DE); Axel De With, Plankstadt (DE)

(73) Assignee: Indag Gesellschaft für Industriebedarf mbH & Co. Betriebs KG, Eppelheim (DE)

( * ) Notice: Subject to any disclaimer, the term of this patent is extended or adjusted under 35 U.S.C. 154(b) by 553 days.

(21) Appl. No.: 13/355,917

(22) Filed: Jan. 23, 2012

(65) Prior Publication Data
US 2013/0186879 A1    Jul. 25, 2013

(51) Int. Cl.
*F27D 11/00*    (2006.01)
*A47J 36/24*    (2006.01)

(52) U.S. Cl.
CPC .................................. *A47J 36/2483* (2013.01)

(58) Field of Classification Search
CPC .............................. A47J 36/2483; A47J 36/30
USPC ................. 219/383, 385, 438, 521, 524, 525; 99/358, 349, 441, 448, 483; 426/107, 426/113, 234, 244, 246, 114
See application file for complete search history.

(56) References Cited

U.S. PATENT DOCUMENTS

| | | | |
|---|---|---|---|
| 3,099,202 A | 7/1963 | Palmer | |
| 3,167,431 A | 1/1965 | Lee, Sr. et al. | |
| 3,645,321 A * | 2/1972 | Robinson | 164/509 |
| 4,996,912 A | 3/1991 | Theimer et al. | |
| 5,069,920 A | 12/1991 | Hildebrand | |
| 6,914,226 B2 * | 7/2005 | Ottaway | 219/775 |

FOREIGN PATENT DOCUMENTS

| | | |
|---|---|---|
| EP | 2175693 A1 | 4/2010 |
| JP | 06261723 A | 9/1994 |
| JP | 2010124781 A | 6/2010 |

OTHER PUBLICATIONS

European Search Report issued on Jan. 25, 2011 in European Patent Appln. No. 10170659.

* cited by examiner

*Primary Examiner* — Dana Ross
*Assistant Examiner* — Joseph Iskra
(74) *Attorney, Agent, or Firm* — Stroock & Stroock & Lavan LLP

(57) ABSTRACT

Systems and methods for thermal treatment of packed product(s), e.g, food items, using electric current, which includes providing interconnected electrodes to facilitate the flow of electric current through the products in series, parallel, or any other combination, thus efficiently heating the products in a controlled manner.

17 Claims, 4 Drawing Sheets

SYSTEM AND METHOD FOR THE THERMAL TREATMENT OF A PRODUCT, PARTICULARLY A FOOD ITEM

FIELD OF THE INVENTION

Embodiments of the present invention relate to systems and methods for the thermal treatment of a product, particularly a food item, by introducing heating energy into the product by use of electric current.

BACKGROUND OF THE INVENTION

Classic preservation methods, for example in an autoclave, cause overpasteurization or oversterilization in the treated products by long heating times and subsequent balancing and holding times, and damage heat-sensitive ingredients, for example colorants and vitamins. Further restrictions consist in a required minimum content of liquid in the product, a maximum size of solid product ingredients, and restricted pack sizes.

As an alternative, it was therefore suggested, for example in GB 1 354 359, to fill a package can consisting of an insulating cylindrical envelope, a metal bottom and a metal lid, with product, to seal it hermetically, and to apply a voltage between the lid and the bottom to sterilize the product. Due to quicker heating and cooling, sensitive ingredients and thus the color, taste and structure of the product are to be better preserved. This method, however, could not yet be economically realized on a large scale.

SUMMARY OF THE INVENTION

The object underlying the invention therefore is to provide a system and a method for product heating on a large scale where the ingredients are protected.

Exemplary embodiments of the system according to the invention comprise: a support system that is configured to receive several packing units which contain one or more products, each packing unit having first and second packing unit electrodes disposed thereon; a first system electrode unit that can be contacted with the first packing unit electrode and a second system electrode unit that can be contacted with the second packing unit electrode to permit an electric current to flow through the first packing unit; the second system electrode unit can also be contacted with the second packing unit electrodes of a second packing unit and the first system electrode unit can also be contacted with the first packing unit electrode of the second packing unit to permit the electric current to flow through the second packing unit.

The first and second system electrode units may also include connector electrodes which may be arranged and/or interconnected such that the current can flow through the packing units placed in a treatment position, either in series or in parallel (or any other suitable configuration now known or later developed). The connector electrodes may also be arranged and/or interconnected such that current can flow through at least two packing units, either in series, in parallel, a combination thereof, or in any other suitable path depending on how the connector electrodes are arranged.

Thus, in exemplary embodiments, the current can flow through at least two packing units overlapping in time or simultaneously, in particular through all packing units simultaneously retained in a treatment position of the system. Thereby, a high number of packing units can be thermally treated simultaneously, and the machine performance of a packing plant can be increased. It is moreover possible to heat several packing units through the use of a common power supply in a controlled manner. In exemplary embodiments, connector electrodes can have such a large surface that they contact several packing units at a time to connect them in parallel. According to definition, the current is a heating current which contains the heating energy for treating the product.

In exemplary embodiments, preferably, two connector electrodes each of the first and the second system electrode units are connected in parallel, and/or at least one connector electrode of the first system electrode unit is connected in series with a connector electrode of the second system electrode unit. In this exemplary arrangement, the electric load resistance formed by the packing units can be flexibly adapted to the working range of a power supply. In particular, the load resistances of different products and/or packing units of different sizes can be adapted to the working range of the respective associated power supply. It is also possible to interconnect the packing units in groups such that the formed groups are each adapted to the working range of a common or separate power supply. It is also possible by the interconnection according to the invention to adapt the heating energy to be introduced into the product to a working range of the power supply or a given treatment time.

In one embodiment of the system, the connector electrodes of the first and the second system electrode units are arranged such that they are substantially opposite to one another in a treatment position for introducing heating energy into one or more products. They may also be oriented in parallel. In this configuration, for packing units where the first and second packing unit electrodes are arranged on one of the faces of the packing unit (e.g., at the front, side, top, bottom, or rear faces), for example as metallic container bottom and container lid, the packing electrodes can be reliably and easily contacted.

In exemplary embodiments, the connector electrodes of the first and the second electrode units are, in the treatment position, arranged so that they do not exceed a maximum distance apart from each other, so that the packing units cannot expand towards the connector electrodes beyond a predetermined distance, if at all, during thermal treatment. This permits the treatment of thin-walled or flexible packing units without an inadmissible expansion of the latter during or as a consequence of thermal treatment.

In one embodiment of the system, the support system that is configured to receive one or more packing units comprises a particularly porous enveloping enclosure which supports and/or encloses the packing units (in part or in whole) during thermal treatment such that the packing units cannot expand beyond a predetermined degree, in particular not beyond a maximum diameter. This permits the treatment of thin-walled or flexible packing units without an inadmissible expansion of the latter during or as a consequence of thermal treatment. In certain embodiments, the enveloping enclosure can be embodied as a changeable transport frame for several packing units, for example as or similar to a honeycomb cluster, in which the packing units can be first prepared, in particular stacked, to subsequently fix the filled transport frame on the support system for subsequent thermal treatment. The enveloping enclosure can thus also be embodied as changeable fitting for receiving packing units of different sizes. Such transport frames can save costs by efficiently incorporating the preparation or orientation of the packing units into the production process. In exemplary embodiments, a porous and therefore water permeable enveloping enclosure facilitates the cooling of the packing unit directly upon the treatment of the product with a coolant, for example by spraying, still within the system according to the invention.

In exemplary embodiments, the system preferably comprises at least one transport system to move the connector electrodes of the first and second electrode unit and the packing units along a common conveyor line during thermal treatment. In this configuration, a continuous stream of packing units can be thermally treated while they are passing through the system in accordance with the invention. The transport system can be provided, for example, at the support that is configured to receive a plurality of packages. The transport system can have one or several drives to actively drive the first and/or the second electrode unit and/or the support system. It is also possible to have the system electrode units, in particular the second system electrode unit (or in alternative embodiments, the first system electrode unit), only run along passively. This means that connector electrodes along the conveyor line are taken along by the packing units by a tight fit or force fit and maintain a predetermined position relative to the packing unit during thermal treatment.

In exemplary embodiments of the system, the support system is configured to receive one or more packages comprising at least one rotation system to rotate the packing units during thermal treatment. Thereby, the product can be mixed before or during heating. Moreover, a desired reaction of the product can be initiated. Preferably, the rotation system rotates the packing unit about its main axis, in particular about an axis perpendicular to the connector electrodes.

An exemplary embodiment of the system furthermore comprises an AC power supply for generating heat in the product, in particular an AC power supply that can generate current within a frequency range of 10 kHz to 10 MHz. By this, Joule heat can be selectively generated in the product and a migration of product components can be avoided. Furthermore, a corrosion of the electrodes when they touch the products through which current is flowing can be avoided or reduced. In certain embodiments, a frequency range of 100 kHz to 10 MHz is preferred because high frequencies promote a penetration of thin layers of low conductivity which can be formed, for example, by the deposition of fat on electrode surfaces. High alternating current frequencies thus prevent a local reduction of the heating power.

Other embodiments of the invention may provide for methods of thermal treatment of products. Exemplary embodiments of methods for thermal treatment may comprise one or more of the following steps: a) receiving several packing units which contain one or more products and at which first and second packing unit electrodes are disposed; b) creating a contact between the first packing unit electrodes and a first system electrode unit and between the second packing unit electrodes and a second system electrode unit to permit electric current to flow; and c) interconnecting connector electrodes provided at the first and the second system electrode units, and applying an electric voltage such that the electric current simultaneously flows through at least two packing units, in series, in parallel and/or in any other suitable configuration.

In exemplary embodiments, the conductivity of the product is preferably within a range of $10^{-3}$ S/m to 10 S/m. In this range, heating can be particularly effectively accomplished, and this for liquid products as well as for solid products and mixed products with solid and liquid ingredients.

In exemplary embodiments, the method of treatment can preferably be used to sterilize the product via thermal treatment. Current-induced heating permits a precise application of energy and can prevent oversterilization with negative effects on product quality. Embodiments of the method of treatment is generally suited for the thermal preservation of products.

In exemplary embodiments, the packing units are preferably cooled with desalted water after thermal treatment. In this case, cooling can be done already directly upon termination of the heating in the region of the connector electrodes without the risk of an electric voltage arc-over due to residual moisture of the connector electrodes in following packing units or product batches.

In exemplary embodiments of the method, a target temperature increase of the product is preferably adjusted by adapting the electric heating energy introduced into the product by use of electric current to the thermal capacity of the product. The target temperature in the packing unit can also preferably be checked at any point during or after thermal treatment by use of the supplied electric heating energy. Moreover, the influence of environmental conditions, which are to be taken into consideration with external temperature measurement, can be neglected and the heating of the product by the actually supplied electric energy can be compared.

In exemplary embodiments, a target temperature increase of the product is preferably monitored at the packing unit from outside by use of an infrared thermometer or pyrometer, and in particular compared to the introduced electric heating energy. By doing this, the target temperature increase can be ensured. The target temperature increase can thereby also be documented.

In exemplary embodiments, the packing units are preferably received in step a) in a hermetically closed state. By this, the finally packed product can be thermally treated, in particular for pasteurization or sterilization, and the quality of the product ready for use can be ensured. However, in exemplary embodiments, treatment can also be performed at not yet finally sealed packing units, for example by placing the upper packing unit electrode onto the product with the packing unit being upright, subsequent thermal treatment and final sealing of the packing unit.

In exemplary embodiments, the packing units are preferably continuously moved along a conveyor line during thermal treatment. By this, the method can be particularly efficiently carried out in a production plant, as higher machine performances are possible compared to a stack-wise batch operation, and no or less product buffers are required in the product stream at the inlet and/or outlet side.

BRIEF DESCRIPTION OF THE DRAWINGS

The foregoing summary, including the above and other features and advantages of the fleet monitoring system and method, as well as a brief description of the preferred embodiments of the application will be better understood when read in conjunction with the appended drawings. For the purpose of illustrating the preferred embodiments of the present inventions, and to explain their operation, drawings of preferred embodiments and schematic illustrations are shown. It should be understood, however, that the application is not limited to the precise arrangements, variants, structures, features, embodiments, aspects, methods, advantages and instrumentalities shown, and the arrangements, variants, structures, features, embodiments, aspects, methods, advantages, improvements and instrumentalities shown and/or described may be used singularly in the system or method or may be used in combination with other arrangements, variants, structures, features, embodiments, aspects, methods, advantages, improvements and instrumentalities.

Preferred embodiments of the invention are represented in the drawing. In the drawings.

DETAILED DESCRIPTION OF THE INVENTION

Figure 1:
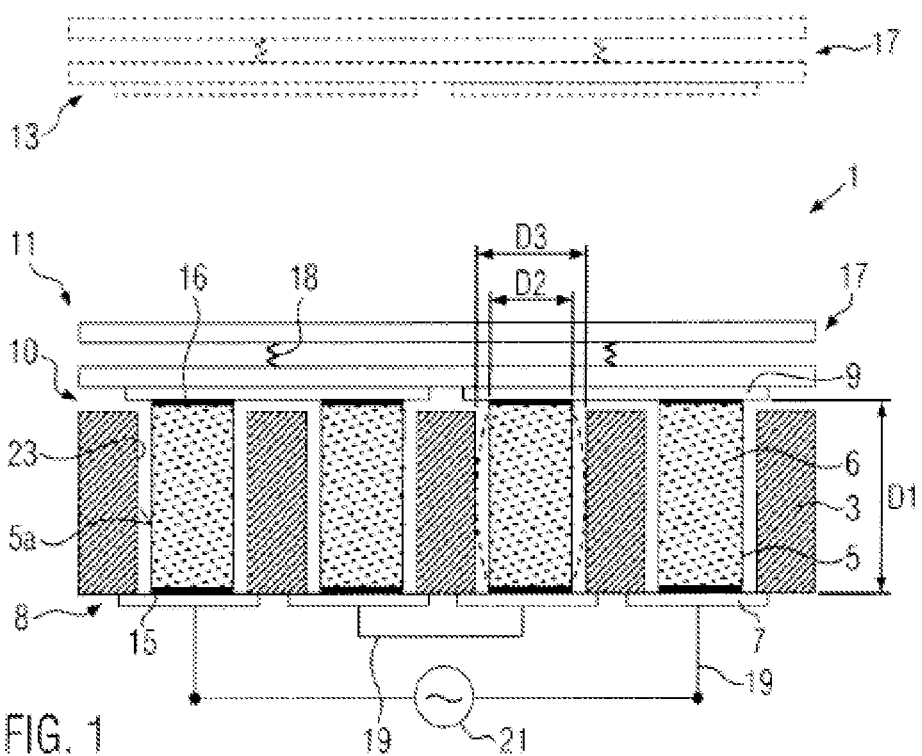
FIG. 1 is a top view of one exemplary embodiment of the invention.

The following description includes many specific details, the inclusion of which is for the sole purpose of illustration and should not be understood to limit the invention in any way. Moreover, certain features which are known to those of ordinary skill in the art are not described in detail in order to avoid complication of the subject matter of the present invention. In addition, it will be understood that features in an exemplary embodiment may be combined with features in other exemplary embodiments of the invention without limitation.

It is to be understood that the invention is not limited in its application to the exemplary details of construction and to the arrangements of the components set forth in the following description of exemplary embodiments or illustrated in the drawings of exemplary embodiments. The invention is capable of other alternative embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. Other alterations or modifications of the above processes are also contemplated. For example, further insubstantial approximations of the process and/or algorithms are also considered within the scope of the processes described herein.

In addition, features illustrated or described as part of one embodiment can be used in or with other embodiments to yield a still further embodiment. Additionally, certain features may be interchanged with similar devices or features now known or later-developed that perform the same or similar functions. It is therefore intended that such modifications and variations are included within the totality of the present invention.

As can be seen in FIG. 1, the system 1 according to exemplary embodiments of the invention comprises a support system 3 configured to receive a plurality of packing units 5 which contain one or more products 6 to be treated with heat, for example a food item to be preserved or a pharmaceutical product. First connector electrodes 7 are provided at the support system 3 for passing an electric treatment current through the one or more products 6 contained in the packing unit 5. The first connector electrodes 7 form a first system electrode unit 8. Second connector electrodes 9 are associated to the first connector electrodes 7 for passing the electric treatment current through the one or more products 6 contained in the packing unit 5. The second connector electrodes 9 form a second system electrode unit 10.

In exemplary embodiments, the first and second system electrode units 8, 10 are movable with respect to each other between a treatment position 11, in which first as well as second connector electrodes 7, 9 touch the packing unit 5 such that electrical contact is created with packing unit electrodes 15, 16 (hereinafter also referred to as packing unit electrodes for better comprehensibility) provided at the packing units 5, such as an electrically conductive container bottom and lid, and a feeding position 13 indicated with a dashed line in which the packing units 5 can be introduced into or withdrawn from the support system 3. In this example embodiment, at least the first or second connector electrodes 7, 9 are not in electrical contact with the packing unit electrodes 15, 16.

In exemplary embodiments, the second system electrode unit 10 is preferably fixed at positioning brace 17 for placing the second connector electrodes 9 onto the associated packing unit electrodes 16. Likewise, in exemplary embodiments, the positioning brace 17 preferably comprises pressing system 18, such as for example at least one pressure spring or an elastic material layer, to create a reliable contact between the packing unit electrodes 15, 16 and the system electrode units 8, 10. In other exemplary embodiments, the pressing system 18 can comprise a locking mechanism instead of or in addition to elastic elements. The pressing system 18 is designed such that a maximum distance D1 between the first and the second connector electrodes 7, 9 can be maintained even against an overpressure in the packing unit 5 during thermal treatment.

It would also be possible to provide several positioning braces 17 for individual connector electrodes 9 or for subgroups of the second connector electrodes 9. The connector electrodes 7, 9 of the system electrode units 8, 10 may be arranged in any combination to contact any number of packing units 5. For instance, in exemplary embodiments, a first connector electrode and a second connector electrode 7, 9 can be arranged and configured with such surface sufficient to contact at least two packing unit electrodes 15, 16. In other exemplary embodiments, to permit a flexible configuration of the first and second system electrode units 8, 10, a first and a second connector electrode 7, 9 can also be provided and arranged such that a first and second connector electrode 7, 9 is provided for each packing unit 5. In yet other exemplary embodiments, the first and second system electrode units 8, 10 may be configured to have some connector electrodes 7, 9 contact a single packing unit 5 and some connector electrodes 7, 9 contact multiple packing units 5.

In exemplary embodiments, the first system electrode unit 8 may also be movable with respect to the support system 3 by use of a further or the same positioning brace 17 to switch, analogously to the second system electrode unit 10, between the treatment position 11 and the feeding position 13.

In exemplary embodiments, it is possible that the system electrode units 8, 10 can be brought into the treatment position 11 simultaneously or at least overlapping in time to close a treatment circuit 19 with an AC power supply 21 through the packing units 5 held between the first and the second connector electrodes 7, 9 and the product 6.

As FIG. 1 furthermore indicates, in exemplary embodiments, the support system 3 comprises mountings 23 for one packing unit 5 each, the mountings 23 at least partially enveloping the packing units 5, so that an expansion of the packing units 5 during thermal treatment is limited by the mountings 23, as is indicated in a dashed line in FIG. 1 for a packing unit 5 by a nominal diameter D2 of the packing unit 5 in the not heated state, and a maximum diameter D3 during thermal treatment which preferably corresponds to the inner diameter of the mounting 23.

In exemplary embodiments, the mountings 23 are preferably, though not necessarily, embodied as an enveloping enclosure, for example as recesses in the support system 3 or as tubular sleeves, the receiving inner cross-sections of the enveloping enclosure preferably being adapted to the shape, in particular the cross-section of the respective packing units 5 to be treated.

In exemplary embodiments, the mountings 23 could also be embodied as quickly exchangeable fitting parts, for example integrated in a transport frame, in particular similar to or as a honeycomb cluster, to adapt the support system 3 to packing units 5 of different sizes and shapes.

In exemplary embodiments, the packing units 5 are provided in a lying position during thermal treatment, which facilitates reliable contact of the product 6 with the packing unit electrodes 15, 16, which is beneficial, for example, when product 6 containing gas bubbles are in the packing unit 5. This positioning also facilitates the handling of the packing units 5, for example when the packing units 5 are stacked in the mountings 23, in particular in changeable transport frames, and/or when they are prepared for thermal treatment. However, in other exemplary embodiments, the support system 3 could also receive the packing units 5 in a standing or substantially upright position on the packing electrodes 15.

In exemplary embodiments, mountings 23 permit thermal treatment accompanied by a significant pressure increase in the packing unit 5, for example during sterilization processes. The mountings 23 limit any expansion and/or deformation of the packing units 5 (see FIG. 1) that may occur. In such cases, even with a comparably low mechanical stability of the packing units 5, a compensating increase of ambient pressure in a hyperbaric chamber may be superfluous. This situation may apply in connection with the pressing system 18 which, in exemplary embodiments, is preferably embodied such that it counteracts or prevents an expansion of the packing unit 5 towards the system electrode units 8, 10.

The mountings 23, however, do not have to be embodied as enveloping mountings, for example, where the packing units 5 are stable enough to withstand a pressure increase during thermal treatment in the system 1. It can also be sufficient for the mountings 23 to only cover a portion of a lateral surface 5a of the packing units 5, for example a centric section to support the latter. The mountings 23 could thus, for example, also be embodied as clamps to facilitate the feeding and emptying of the system 1 and/or to mechanically protect the packing units 5 in the treatment position 11 from an excessive deformation as a consequence of an internal pressure increase. The mountings 23 can also be embodied in any other format that achieves the foregoing that is now known or later developed.

In accordance with exemplary embodiments of FIG. 1, first and second connector electrodes 7, 9 are shown. They are preferably connected in series (but, in other preferred embodiments, may be connected in parallel, a combination of in series and in parallel arrangements, or in any other suitable configuration) and form part of electric circuit 19. In this configuration, the same treatment current can flow through the associated packing units 5, which also preferably form part of electric circuit 19. In one exemplary embodiment, first connector electrodes 7 are shown as narrower electrodes (which facilitate connection to a packing unit electrode of a single packing unit), whereas second connector electrodes 9 are shown as wider electrodes (which facilitate connection to multiple packing units). In other embodiments, first and second connector electrodes 7, 9 may be connected and arranged in various wider and/or narrower combinations (and may include any number or magnitude of widths). Furthermore, an overall parallel connection or a parallel connection for single and/or multiple groups would also be possible, so that between the connector electrodes 7, 9 connected in parallel, the same voltage can be applied.

Figure 2:
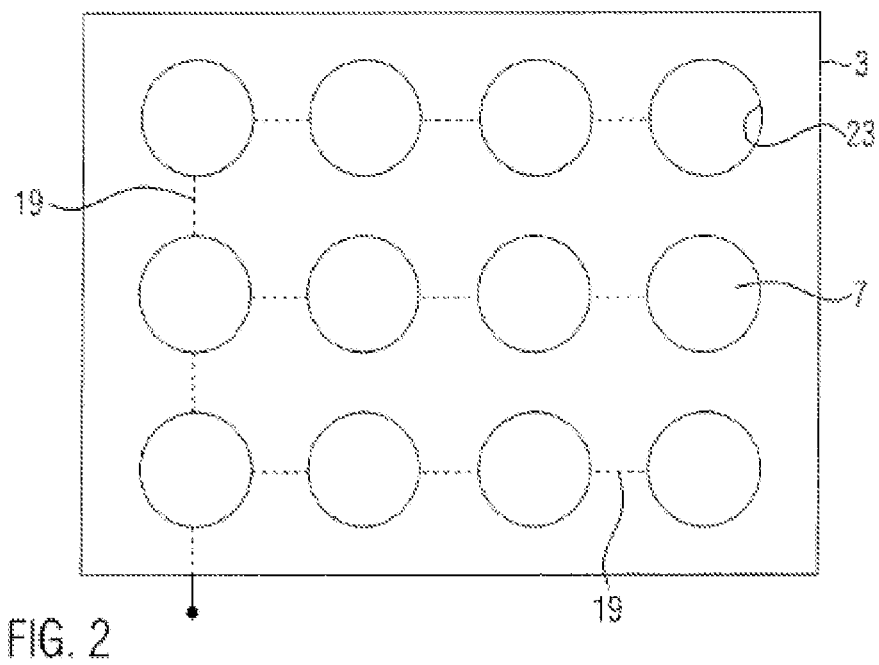
FIG. 2 is a partial side view of an electrical interconnection of an exemplary embodiment of the invention.

FIG. 2 shows a partial side view of an exemplary embodiment in which the first connector electrodes 7 are connected in parallel. It will be understood that the second connector electrodes 9 are preferably interconnected accordingly in accordance with such exemplary embodiment. Alternatively, combinations of any number of in series connection and in parallel connections are also possible. In this manner, the electric connected loads, in particular the load resistance of different products 6, can be adapted to the characteristic of the AC power supply 21. The number and arrangement of the shown connector electrodes 7, 9 and mountings 23 are here only given by way of example.

Figure 3:
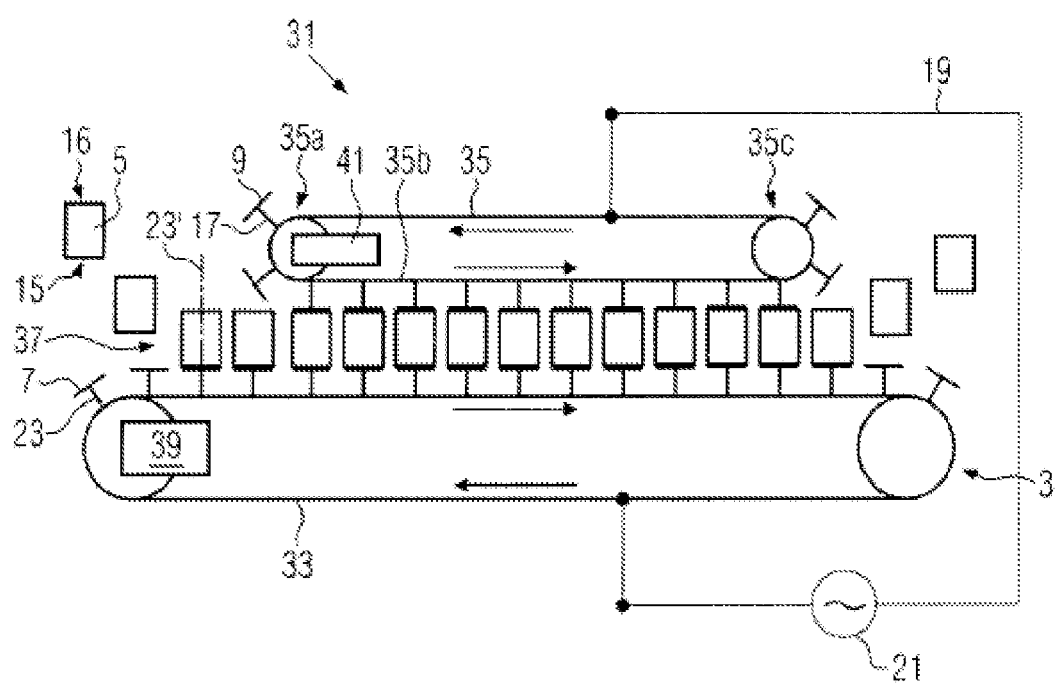
FIG. 3 is a plan view of an exemplary embodiment of the invention.

While certain embodiments of the system 1 are directed to thermal treatment of the product 6 provided in stacks, other embodiments, e.g., system 31 as shown in FIG. 3, may be configured for the treatment of a stream of packing units 5 continuously passing through the system 31.

As shown in FIG. 3, according to exemplary embodiments, the support system 3 may comprise first transport system 33, preferably in the form of a continuous conveyor belt, with mountings 23 and first connector electrodes 7. For the sake of simplicity, these are only schematically indicated and can comprise, for example, clamps and recesses for retaining and/or enveloping the packing units 5, as well as other devices now known or later developed. Other devices may also be used, for example vacuum-supported suction compensators for coupling the packing units 5 to the support system 3.

As FIG. 3 further shows, a second transport system 35 may also be provided, preferably in the form of a continuous conveyor belt, for placing and moving the second connector electrodes 9 along a common conveyor line 37 for the first and the second connector electrodes 7, 9 and the packing units 5 held between them. The second connector electrodes 9 can be placed at a first reversal point 35a of the second transport system 35, in the example shown in FIG. 3, at the start of an inner run 35b of the second transport system 35, and the connector electrodes 9 can be correspondingly removed at a second reversal point 35c, in the example shown in FIG. 3, at the end of the inner run 35b.

In exemplary embodiments, it would be also possible to provide a positioning brace 17 for placing the second connector electrodes 9 onto the associated packing unit electrodes 16, preferably in the form of separate lifting mechanisms, to press the second connector electrodes 9 individually against the second packing unit electrodes 16. Alternatively, a pressing system 18 can also be provided. The first and second connector electrodes 7, 9, which are, for the sake of simplicity, only represented in the region of the transport system 33, 35 facing each other, form a first and a second system electrode unit 8, 10 to permit current to flow through the electric circuit 19 and thus through the product 6. The electrical connection to the transport system 33, 35 is represented in a simplified manner in FIG. 3. In alternative exemplary embodiments, the connector electrodes 7, 9 can be incorporated in the electric circuit 19 at other sites or at separate connection points.

In exemplary embodiments, the first and second connector electrodes 7, 9 are preferably connected in parallel. This permits a particularly simple electrical connection of the system electrode units 8, 10 to the AC power supply 21.

In exemplary embodiments, at least one of the system electrode units 8, 10 may include a switching system (not shown) to open and close the electric circuit 19 through the connector electrodes 7, 9 and the packing unit electrodes 15, 16. Preferably, the switching system permits a separate switching on and off of the treatment current through individual packing units 5. This enables the treatment current to be switched on and off independent of the point in time of placing the respective connector electrode 9 onto the packing unit electrode 16.

In exemplary embodiments, the connector electrodes 7, 9 may be arranged either successively, one on top of another, or in any combination thereof, in the conveying direction such that several parallel conveyed streams of packing units 5 may be treated in the system 31. The connector electrodes 7, 9 each arranged one on top of the other could, in an exemplary embodiment, also be connected in parallel or in series and/or be supplied by the same or separate power supplies 21. Thus, in exemplary embodiments, a flexible interconnection of the connector electrodes 7, 9 is preferred in system 31 such that thermal treatment of a continuous product stream is also possible.

In exemplary embodiments, the transport systems 33, 35 preferably include separate drive units 39, 41 to actively move the mountings 23 with the first connector electrodes 7 and the connector electrodes 9 along the conveying section 37. However, in other exemplary embodiments, it would also be possible to provide a separate drive 39, 41, for example only at the first or second transport system 33, 35, and to have the respective other transport system 33, passively run along, as long as sufficient contact between the connector electrodes 7, 9 and the packing unit electrodes 15, 16 is ensured. Yet in other embodiments, one drive unit may be configured to drive both transport systems 33, 35. The speed of the transport system 33, 35 can also preferably be adjusted, so that the heating of the product 6 can also be influenced by the dwell time on the transport system 33, 35.

The arrangement shown in FIG. 3 is an exemplary embodiment for conveying the packing units 5 in a lying position during thermal treatment, wherein the connector electrodes 7, 9 are arranged laterally with respect to the conveyor line 37 in the treatment position 11. The mountings 23 may be, for example, tub-like or channel-like recesses.

In other exemplary embodiments, an upright transport may be provided for certain products 6 and/or packing units 5. For example exemplary embodiments may include a lower transport system 33, mountings 23, first connector electrodes 7, an upper transport system 35, and connector electrodes 9. This arrangement facilitates a simple feeding of the system 31 and withdrawal of the treated packing units 5 as the packing units 5 can be placed upright onto the lower transport system 33. The upper transport system 35 is then either driven in a suitable manner or running along passively, so that the connector electrodes 9 move during the treatment of the product 6 synchronously with the associated connector electrodes 7 and packing units 5.

In exemplary embodiments, the mountings 23 could be rotated about an axis 23' perpendicular to the connector electrodes 7, 9 by use of a rotation system (not shown) provided at the support system 3 (such as a motor and a shaft) to promote the mixing of the product or a reaction in the product 6. This is preferably carried out such that during the energy consumption via the packing unit electrodes 15, 16, the electrical contact is not interrupted by a possible shifting of gas-filled spaces in the packing unit 5.

It will be understood that exemplary embodiments may include connector electrodes 7, 9 interconnected into groups or connector electrodes 7, 9 may be provided as continuous contact surfaces. For example, at least one transport system 33, 35 may include an electrically conductive conveyor belt to create a contact with the packing unit electrodes 15, 16.

In operation, the product 6 is provided in packing units 5 with two packing electrodes 15, 16 each through which a current can flow for the thermal treatment of the product 6. Depending on the electric conductivity of the product 6, the connector electrodes 7, 9 of the first and second system electrode units 8, 10 are interconnected such that a total load resistance through all packing units 5 is within a predetermined working range suited for an AC generator 21 to be connected. Alternatively, connector electrodes 7, 9 may be interconnected in groups and the groups may be connected to separate AC generators 21.

In exemplary embodiments, the thermal treatment of the product 6 can be optimized by connecting the packing units 5 based on the electric conductivity of the product 6 and/or the packing dimensions in a suitable manner, for example, in parallel, in series, or in a combination of series and parallel connections to one or several AC generators 21, which permits the treatment process to be conducted within the optimal working range of the respective employed AC generator 21.

For cost reasons, it may be desirable to simultaneously heat as many packing units 5 as possible with only one AC generator 21. Thus, in some embodiments it may be advantageous to interconnect packing units 5 having identical electric connected loads, meaning identical contents and identical packing sizes may be grouped together and supplied with alternating current.

The packing units 5 may be filled with one or more products 6 that may be provided from a provision system (not shown) onto a mounting 23 of the support system 3. In certain exemplary embodiments, the mountings 23 may be components of a changeable transport frame, which may be equipped with the packing units 5 and inserted into the support system 3. In the feeding position 13, the first packing unit electrodes 15 of the packing units 5 are thus arranged in the region of the first system electrode unit 8.

The second system electrode unit 10 is placed onto the exposed second packing unit electrodes 16 to create an electrical connection between the connector electrodes 7, 9 of the first and the second system electrode units 8, 10 and the product 6 in the packing units 5, placing the foregoing in a treatment position 11. Here, the connector electrodes 7, 9 of the first and second system electrode units 8, 10 are arranged at a fixed distance D1 to each other (which is particularly beneficial in the case of thin-walled packing units 5), which distance does not change even when there is a heat-related pressure increase in the packing unit 5. With thin-walled packing units 5, the mountings 23 are preferably capable of preventing an inadmissible expansion of their lateral surfaces 5a as a consequence of a heat-related pressure increase.

In exemplary embodiments, an alternating voltage calculated and adapted to treat the product 6 within the dimensions of the packing units 5 may be applied to the connector electrodes 7, 9, so that current flows through the product 6. In this regard, the product 6 may be treated, for example, by Joule heating.

In exemplary embodiments, the frequency of the voltage source may be 50 Hz to 10 MHz, may preferably be 10 kHz to 10 MHz, and may ideally be 100 kHz to 10 MHz.

The amount of the required application of energy depends on the specific thermal capacity, but also on the electric properties of the respective product 6, in particular on the homogeneity of the spatial distribution of conductivity in the product 6. With an inhomogeneous product conductivity, for example a mixture of an electrolyte and solids, the product proportion with higher conductivity is heated more quickly, and the product proportion with lower conductivity is in addition heated by heat conduction. The extension of the treatment time caused by this can be taken into consideration in the interconnection of the connector electrodes 7, 9 and the treatment parameters of the AC generator 21.

In exemplary embodiments, the heating of the product 6 is checked with reference to the electric energy emitted by the AC generator 21, thereby permitting a more reliable and easy monitoring of thermal treatment than conventional temperature measurement at or in the closed packing unit 5. The supplied electric energy may also be precisely dosed, where the temperature increase of the product 6 may be determined depending on the known thermal capacity of the product 6. Thermal treatment can thus be carried out within a short time and with high precision.

Figure 4:
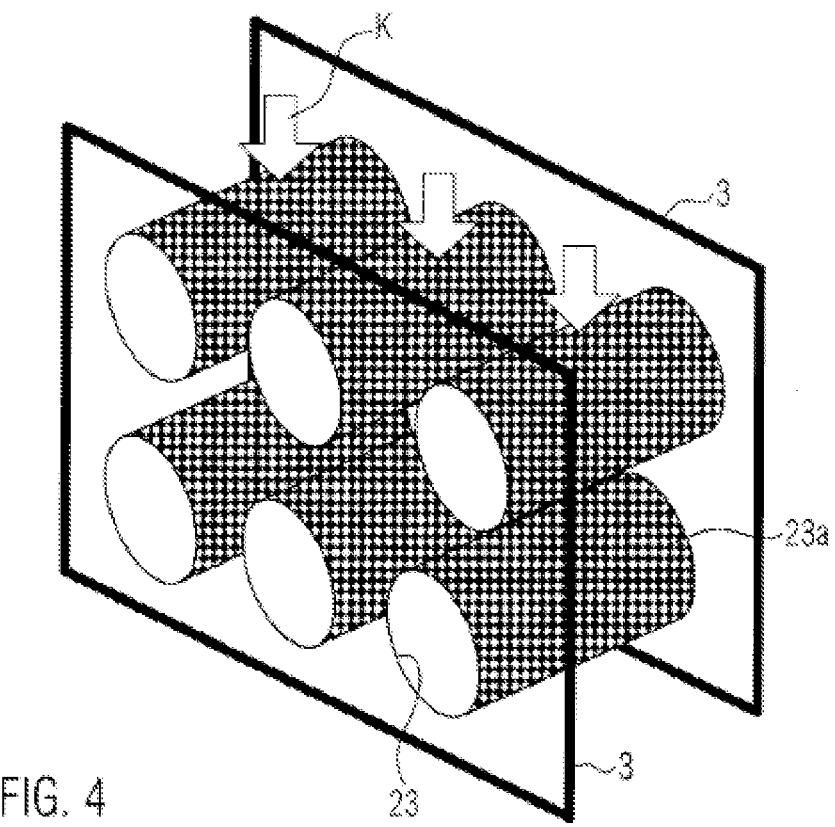
FIG. 4 is a perspective view of a porous enveloping enclosure for spray cooling packing units in accordance with an exemplary embodiment of the invention.

In exemplary embodiments, the packing unit 5 is preferably cooled while it is still in the system after the termination of energy application in order to protect the product 6. This is preferably done with deionized water which ensures an effective heat transfer and reduces the risk of an electric arc-over to connector electrodes 7, 9 wetted with cooling water. Alternative embodiments of the system 1, 31 may provide for product 6 cooling, for example, one such embodiment is shown in FIG. 4. Accordingly, the support system 3 may be embodied as a transport frame with porous mountings 23, such that spray cooling of the packing units 5 (as indicated by arrows K) or a comparable water supply through openings 23a formed in the mountings 23 is possible. The mountings 23 can comprise, for example, pressure-resistant perforated plates, plaiting or similar water-permeable structures. It is preferable that the porous mountings 23 are stable enough and can envelope the packing units 5 such that an undesired deformation of the packing units 5 during thermal treatment is preferably not possible and cooling is preferably possible directly upon the termination of the electric energy supply.

Depending on the stability of the packing units 5 and the maximum temperature of the product 6, thermal treatment may also be carried out in a hyperbaric chamber.

Once the treatment is complete, the thermally treated packing units 5 can be withdrawn from the support system 3 and they can then be reloaded.

In exemplary embodiments, for example, system 31, the packing units 5 may be supplied and withdrawn from the system 31 as continuous product stream rather than in batches as in other exemplary embodiments. Thus, the thermal treatment of individual packing units 5 overlaps in time. In other words, in such embodiments, the treatment current simultaneously flows through at least two packing units 5 while the packing units 5 are being conveyed. Thermal treatment can be adapted to the performance capacity of a particular machine by modifying the conveyance speed.

The invention is not restricted to certain packing units 5 as long as at least two packing unit electrodes 15, 16 for passing electric current through the product are provided at them.

In exemplary embodiments, the packing unit electrodes 15, 16 are preferably arranged at the front face of the packing unit 5. Furthermore, the packing unit 5 may include at least one electrically insulating lateral surface 5a. Electrically conductive and insulating is here to be understood as a functional definition based on current flow relevant for the thermal treatment of the product 6. This means that the current employed for thermal treatment preferably flows through the packing unit electrodes 15, 16 and the product 6, and not through the insulating lateral surface 5a. The electric conductivity of the electrically insulating lateral surface 5a is negligibly small compared to the electric conductivity of the product 6 and that of the packing unit electrodes 15, 16.

In exemplary embodiments, the packing unit electrodes 15, 16 can be made of conductive materials, for example stainless steel or of a composite material, wherein at least the inner surface facing the product is electrically conductive across the whole surface and there is an electrically conductive connection to the outer surface of the packing unit electrode 15, 16. The packing unit electrodes 15, 16 are preferably arranged in parallel to each other, so that in the packing unit 5, a homogeneous distribution of the current flow through the product 6 results. For the same reason, the packing unit electrodes 15, 16 are preferably flat and have a surface as large as possible. Thus, in certain embodiments, it is advantageous to embody the packing unit electrodes 15, 16 as metallic front faces of an otherwise insulating packing unit 5 with an ellipsoidal or polygonal cross-section, in particular as front faces of a cylindrical packing unit 5, for example a can. This promotes the embodiment of a homogeneous electric field to heat the product 6 as uniformly and quickly as possible, in particular also in solid product components in which conventional heating by heat conduction is often restricted.

In exemplary embodiments, the packing unit electrodes 15, 16 are integral components of the packing unit 5 and are preferably made of stainless steel sheet or other conductive materials permitted for food, for example metal alloys or composite materials. Vaporized plates and foils may also be used.

For a thermal treatment based on Joule heating, products 6 with an electric conductivity of 1 mS/m to $10^4$ mS/m are suited which can create a permanent contact with the packing unit electrodes 15, 16. The products 6 can be homogeneous or inhomogeneous and may have different electric conductivities. Preferably, the electric conductivities of the individual components of the product 6, however, differ at most by a factor of three.

Figure 5:
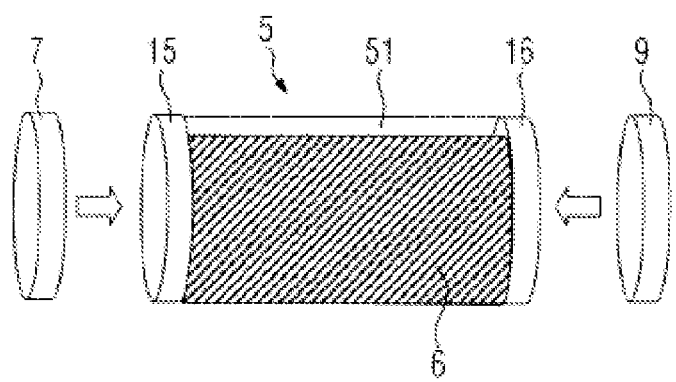
FIG. 5 is a filled packing unit in a lying position configured for supplying electric energy in accordance with an exemplary embodiment of the invention.

A gas-filled space 51 in the packing unit 5, as indicated, for example, in FIG. 5, is provided to accommodate the expansion of the product 6 depending on the application. The gas-filled space could take, for example, up to 10% of the volume of the packing unit 5. Moreover, for contacting the filled and upright standing packing units 5 with the packing unit electrode 15 or 16, a liquid-free contact point above the product 6 is advantageous. In FIG. 5, the connector electrodes 7, 9 are shown with the packing unit 5 in the lying treatment position, which ensures that the product 6 is in contact with both packing unit electrodes 15, 16 across a preferably large surface during the energy input.

In exemplary embodiments, the material of the packing unit 5 is preferably selected such that it can resist an inner overpressure of $10^6$ Pascal to at least $3 \times 10^5$ Pascal. If less resistance or thinner materials are employed, thermal treatment can take place in a hyperbaric chamber to mitigate any external overpressure due to the heating-related pressure increase in the packing, which may occur at temperatures above 100° C. As an alternative, the packing 5 can be protected against excessive expansion by the described enveloping enclosure 23.

Any number of above-described components may preferably be used alone or in conjunction with each other in any configuration to achieve the desired system. The versatility of these components allow for ease of system expansion and upgrades.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention. While there had been shown and described fundamental features of the invention as applied to exemplary embodiments thereof, it will be understood that omissions and substitutions and changes in the form and details of the disclosed invention may be made by those skilled in the art without departing from the spirit of the invention. Moreover, the scope of the present invention covers conventionally known, future developed variations and modifications to the components described herein as would be understood by those skilled in the art.

The invention claimed is:

1. A system for the thermal treatment of products, wherein the products are food items, by introducing a heating energy into the products using an electric current when the system is in a treatment position, the system comprising:
   a support system configured to receive a plurality of packing units, wherein each packing unit contains at least one product and each packing unit has at least one first packing unit electrode and at least one second packing unit electrode disposed thereon; and
   a first system electrode unit having at least two first connector electrodes, wherein each first connector electrode is placed in contact with the at least one first packing unit electrode when the system is in the treatment position to permit the electric current to flow therethrough;
   a second system electrode unit having at least two second connector electrodes, wherein each second connector electrode is placed in contact with the at least one second packing unit electrode when the system is in the treatment position to permit the electric current to flow therethrough;
   wherein the first connector electrodes of the first system electrode unit are arranged to be opposite the second connector electrodes of the second system electrode unit when the system is in the treatment position; and
   wherein the at least two first connector electrodes are selectively interconnected with each other, and the at least two second connector electrodes are selectively interconnected with each other, to permit the current to flow through at least two packing units at least one of in series and in parallel when the system is in the treatment position.

2. The system of claim 1, wherein, in the treatment position, at least one connector electrode of the first system electrode unit and at least one connector electrode of the second system electrode unit are spaced at most a maximum distance apart to prevent the packing units from expanding towards the connector electrodes during thermal treatment.

3. The system of claim 1, wherein the support system includes a porous enveloping enclosure to contain the packing units during thermal treatment such that the packing units cannot expand beyond a maximum diameter.

4. The system of claim 1, wherein the support system includes at least one transport system to move the connector electrodes of the first and the second system electrode units and the packing units along a common conveyor line during thermal treatment.

5. The system of claim 1, wherein the support system includes at least one rotation system to rotate the packing units during thermal treatment.

6. The system of claim 1 further comprising a power supply for generating the heating energy to heat the products, wherein the power supply is selectively caused to generate a current within a frequency range of 10 kHz to 10 MHz.

7. A method of thermally treating a plurality of packing units containing at least one product, wherein the at least one product is a food item, by introducing heating energy to the at least one product using an electric current, the method comprising the following steps:
   receiving a first packing unit and a second packing unit, wherein the first and second packing units each contain at least one product and the first and second packing units each have at least a first packing unit electrode and a second packing unit electrode disposed thereon;
   providing a first system electrode having a connector electrode and a second system electrode having a connector electrode;
   positioning the connector electrode of the first system electrode opposite the connector electrode of the second system electrode unit;
   selectively causing the at least one first packing unit electrode of each packing unit to contact the connector electrode of a first system electrode unit and selectively causing the at least one second packing unit electrode of each packing unit to contact the connector electrode of the second system electrode unit to permit electric current to flow therethrough;
   selectively interconnecting at least two connector electrodes provided on the first system electrode unit and at least two connector electrodes provided on the second system electrode unit; and
   applying an electric voltage to cause the electric current to flow through the first and second packing units at least one of in series and in parallel to cause an increase in a temperature of the at least one product.

8. The method of claim 7, wherein the conductivity of the at least one product is within a range of $10^{-3}$ S/m to 10 S/m.

9. The method of claim 7, wherein the at least one product is at least one of pasteurized and sterilized by exposure to thermal treatment.

10. The method of claim 7, wherein the first and second packing units are cooled with desalted water after thermal treatment.

11. The method of claim 7, wherein the temperatures of the at least one product in the first and second packing units are externally monitored with a thermometer device.

12. The method of claim 7, wherein the first and second packing units are received in a hermetically closed state.

13. The method of claim 7, wherein the first and second packing units are continuously moved along a conveying line during thermal treatment.

14. The system of claim 1, wherein the first connector electrodes of the first system electrode unit and the second connector electrodes of the second system electrode unit are arranged as to be substantially parallel to each other for introducing heating energy into the products when the system is in the treatment position.

15. A system for the thermal treatment of products, wherein the products are food items, by introducing heating energy into the products using an electric current when the system is in a treatment position, the system comprising:

a support system configured to receive a plurality of packing units, wherein each of the packing units contains at least one product and has at least a first packing unit electrode and a second packing unit electrode disposed thereon; and a first system electrode unit having at least one first connector electrode, wherein the first connector electrode is in contact with a first packing unit electrode of one of the packing units when the system is in the treatment position to permit the electric current to flow therethrough;

a second system electrode unit having at least one second connector electrode, wherein the second connector electrode is in contact with a second packing unit electrode of one of the packing units when the system is in the treatment position to permit the electric current to flow therethrough; and wherein the first connector electrode of the first system electrode unit are arranged to be opposite the second connector electrode of the second system electrode unit when the system is in the treatment position.

16. The system of claim 15 wherein the plurality of packing units may be selectively arranged at least one of in series and in parallel between the first connector electrode of the first system electrode unit and the second connector electrode of the second system electrode unit when the system is in the treatment position to permit the electric current to flow therethrough.

17. The system of claim 15, further comprising a plurality of first connector electrodes and a plurality of second connector electrodes designed and configured to facilitate the flow of electric current through the packing units at least one of in series and in parallel when the system is in the treatment position.

\* \* \* \* \*